United States Patent [19]

Candea

[11] Patent Number: 4,807,335
[45] Date of Patent: Feb. 28, 1989

[54] GASKET HANDLING DEVICE

[75] Inventor: Cornell Candea, Clawson, Mich.

[73] Assignee: Chrysler Motors Corporation, Highland Park, Mich.

[21] Appl. No.: 53,902

[22] Filed: May 26, 1987

[51] Int. Cl.⁴ .................................................. A41F 1/00
[52] U.S. Cl. ........................................ 24/453; 24/607; 29/451; 411/41
[58] Field of Search ................. 24/606, 607, 453, 458, 24/573, 618, 620, 623, 624, 294, 295; 411/41, 60, 57, 40, 45, 46; 29/271, 451, 453; 277/9, 9.5, 10, 11, 181, 189

[56] References Cited

U.S. PATENT DOCUMENTS

| 2,826,110 | 3/1958 | Lemelson | 411/57 |
| 3,000,086 | 9/1961 | Davis | 24/453 X |
| 3,606,814 | 9/1971 | MacKenzie | 411/60 |
| 4,114,509 | 9/1978 | Poe | 24/607 |
| 4,221,039 | 9/1980 | Smith | 24/458 X |
| 4,276,806 | 7/1981 | Morel | 411/41 |
| 4,405,272 | 9/1983 | Wollar | 411/41 |

FOREIGN PATENT DOCUMENTS

| 1941150 | 2/1971 | Fed. Rep. of Germany | 411/60 |
| 2005372 | 4/1979 | United Kingdom | 411/60 |

Primary Examiner—Kenneth J. Dorner
Assistant Examiner—James R. Brittain
Attorney, Agent, or Firm—Kenneth H. MacLean, Jr.

[57] ABSTRACT

A clip assembly for attachment to a flexible gasket which has at least one opening therethrough, the assembly imparting sufficient rigidity to the gasket for convenient transportation and handling. The assembly consists of two plate members extending in overlaying relation with one another and with the gasket, one member having an expandable protrusion easily slid into the gasket opening and the other member having a projecting pin which produces expansion of the protrusion to thereby secure the gasket to the assembly.

1 Claim, 1 Drawing Sheet

GASKET HANDLING DEVICE

BACKGROUND OF THE DISCLOSURE

There have been many attempts to provide a reliable, low cost and reusable retainer means for handling a flexible part, such as a gasket, particularly prior to its final assembly where it is secured between a part, such as an engine block and another part such as an oil pan. These gaskets used to seal an oil pan to the engine block or the like are generally very flexible. Accordingly, a means to easily handle these gaskets, such as by mounting them to a rigid surface is desirable. Examples of earlier devices are found in U.S. Pat. Nos. 2,593,648; 1,435,837; 2,745,521 and 2,576,003. The '648 patent comprises a generally U-shaped clip of spring metal whose ends engage a gasket and a body, respectively.

The '837 patent discloses a clip which is insertable from one side of the body, unlike the '648 patent. However the U-shaped end thereof which engages both the edge of the gasket and the body must accurately engage the parts or the gasket will probably not be reliably secured. Also, the active spring portions of the clips project from the gasket or body and are subject to damage. Likewise the '239 patent is subject to the same disadvantages.

The '521 patent discloses a clip in the form of a plastic(deformable), tubular stem which is insertable in a threaded opening to retain the gasket by its outwardly turned outward edge. This type of retainer or is not reusable.

SUMMARY OF THE INVENTION

Accordingly, it is desirable to provide a reuseable gasket retainer which can be easily inserted and subsequently extracted from a gasket opening. The retainer imparts sufficient rigidity to the flexible gasket so that the it and the retainer may be easily handled. Also, the retainer extends into the gasket opening which protects it from damage.

The subject retainer is reliable and very positive by locking into a gasket opening. A retainer end portion is inserted into and then radially expanded against the portions of the gasket which encircle the opening to secure the gasket to the retainer and thus stiffen it. This expansion is produced by the insertion of a pin which is mounted on a lock plate or body and is part of the retainer.

A gasket engaging surface of retainer overlies the gasket and is maintained thereagainst while the expanded portion secures the retainer to the gasket. The retainer can also be easily parted from the gasket and then reused by removing the pin portion from the expansive end portion.

Other advantageous features and desirable characteristics of the subject retainer will be readily apparent from an examination of the detailed description that follows, with reference to the detailed drawings of preferred embodiments as described hereafter.

THE DRAWINGS OF PREFERRED EMBODIMENTS

DETAILED DESCRIPTION OF PREFERRED EMBODIMENTS

Figure 1:
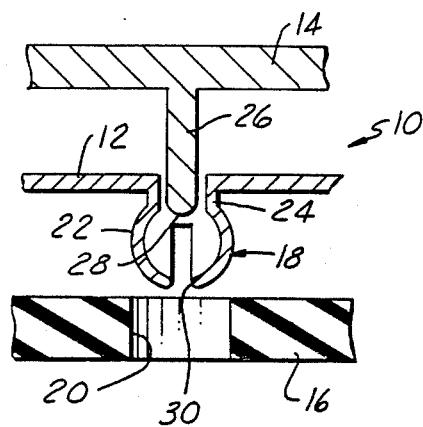
FIG. 1 is a sectioned view of a first embodiment in an unassembled condition.
Figure 2:
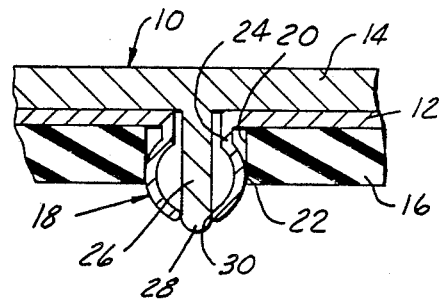
FIG. 2 is a sectioned view of the first embodiment in an assembled condition.

In FIGS. 1–2, a gasket stiffener or retainer assembly 10 is illustrated both in unassembled and in assembled views. The retainer 10 basically consists of an elongated matching plate member 12 and an elongated locking plate member 14 both of which conform to the outline or profile of a flexible gasket 16. As shown in FIG. 2, the members 12, 14 and 16 are adapted to overlie one another in sandwich like relation. The matching plate member 12 has a number of protrusions 18 (only one is shown). The protrusions 18 extend downward in the drawings and are located along the elongated member 12 in alignment with openings 20 in the gasket 16 normally used to receive the fasteners (not shown) which secure the gasket 16 and other related parts together. The protrusions 18 are integrally formed with the body of the member 12 and are generally bulb shaped, hollow parts. The greater diameter bulb shaped portion 22 is sized to be easily inserted into the opening 20 of the gasket. Portion 20 is integrally attached to the main body of member 12 by a connecting thin walled portion 24 which is flexible enough to permit limited movement of the bulb shaped portion 18 as described more thoroughly hereafter.

Figure 3:
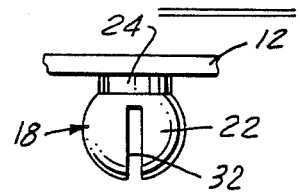
FIG. 3 is a view in elevation of a part shown in FIGS. 1,2.
Figure 4:
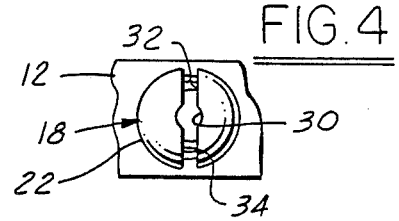
FIG. 4 is a plane view of the part shown in FIG. 3.

The locking plate member 14 has an elongated body adapted to overlie the elongated matching plate member as seen in FIG. 2. A number of pin portions 26 (only one is shown) depend from the elongated body of the member 14 and the pin has a rounded end portion 28 for easy entry into the bulb shaped portion 18 as shown in FIG. 2. As best shown in FIGS. 3 and 4, the bulb shaped portion 18 of member 12 has an opening 30 to the hollow interior thereof. In addition, the bulb shaped portion 18 has at least one but preferably two oppositely positioned slots 32 and 34 therein. The sizing of the opening 30 in portion 18 with relation to the dimension of the pin 26 is such as to cause the outer diameter of the bulb shaped portion to increase as the pin 26 moves into the locked position shown in FIG. 2.

The matching plate member 12 is secured to the flexible gasket 16 in order to impart a degree of flexibility to the assembly such that the gasket 16 can be easily handled and transported during an assembly of specific parts. The use of the subject assembly 10 is particularly desirable in the assembly of an automobile engine. Specifically, the gasket may be for placement between the bottom edge of an engine block and the attachment flange of an oil pan. Consequently, the combination of the members 12 and 14 should be of a material and size to produce the degree of rigidity necessary for the indicated stiffening purpose. While the members 12, 14 are sectioned in FIGS. 1, 2 as of metal material, other materials such as a relatively rigid and strong plastic would also be appropriate. Also, one member might be of a lightweight metal such as aluminum and the other member might be plastic.

Figure 5:
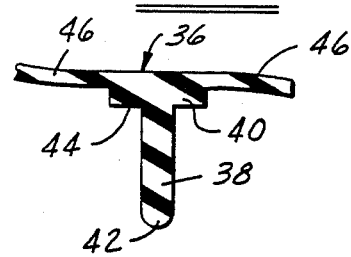
FIG. 5 is a sectioned view of a modification to a part shown in FIGS. 1 and 2.

In FIG. 5, a modification of the assembly and specifically of the lock plate member is indicated. A modified lock plate 36 is illustrated and is sectioned to represent plastic material. A depending pin 38 is integrally connected to a thickened contact portion 40 of plate member 36. Although only one contact portion 40 is shown in FIG. 5, it is contemplated that a plurality o them would be used (one for each opening 20 in the gasket 16). The pin 38 has a rounded end portion 42 as in the embodiment of FIGS. 1-4. The contact portion 40 defines a limited surface 44 about the pin 38 for engaging portions of the gasket (see FIGS. 1, 2) about the opening 20 therethrough. The contract portions of assembly 36 are flexibly interconnected by relatively thin strap portions 46. This construction of the locking plate member easily molds to the shape of the gasket and is easy to remove or disengage from the matching plate.

Although the illustrated and described embodiments are preferred embodiments, other modifications in shape, design and material are contemplated and may well fall within the scope of the following claims which define the invention.

I claim:

1. In combination: an elongated gasket with spaced openings therethrough, the gasket characterized by relative flexibility and lack of stiffness thereby rendering the gasket inconvenient for handling;

an elongated gasket handling and stiffening device adapted to overlay the elongated gasket, the device having put means for engaging the wall portion of the gasket opening whereby the gasket and handling device provides sufficient stiffness for handling;

the handling and stiffening device including an elongated and relatively rigid first plate member for extending along the gasket in overlying contact therewith, the first plate member having a depending protrusion corresponding to each gasket opening which extends into the gasket opening and positioning substantially the entire protrusion within the thickness of the gasket when the first plate member and gasket are in overlying contact with one another, the protrusion having a generally bulbous configuration with a diameter just sufficient to permit a close fit with the gasket opening as the first plate member is in overlying contact with the gasket, the protrusion being of thin-walled construction with a hollow interior and further having a lesser diameter base portion interconnected to the first plate member;

an elongated second plate member adapted to overlie the first plate member, the second plate member having a pin like protrusion corresponding to each bulbous protrusion of the first plate member;

the first plate member having first aperture means therethrough extending into each of the hollow interiors of the bulbous protrusions and having second aperture means extending through the thin-walled bulbous protrusion at a location diametrically opposite the first aperture, the aperture means being aligned to receive the pin like protrusion of the second plate member when the second plate member is moved into an overlying contact with the first plate member;

slot means in the bulbous protrusion which interconnect with the second aperture to permit a general radial outward expansion of the bulbous protrusion as the pin like protrusion extends through the first and second aperture means whereby a slight increase in diameter of the bulbous protrusion produce a firm engagement between the bulbous protrusion and the encircling wall portions of the gasket opening, the diameter of the pin like protrusion being slightly greater than the diameter of the second aperture which produces in the slight increase in diameter of the bulbous protrusion by movement of the pin like protrusion through the second aperture.

* * * * *